United States Patent
Garrett et al.

(10) Patent No.: US 12,028,792 B2
(45) Date of Patent: Jul. 2, 2024

(54) SYSTEMS AND METHODS FOR SEAMLESSLY TRANSFERRING A RADIO CONNECTION BETWEEN COMPONENTS OF A CLIMATE CONTROL SYSTEM

(71) Applicant: Trane International Inc., Davidson, NC (US)

(72) Inventors: Carl L. Garrett, Tyler, TX (US); Nathan Smith, Tyler, TX (US); Daniel J. Blair, Tyler, TX (US); Drew Whitehurst, Tyler, TX (US); Caleb Davis, Tyler, TX (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 18/069,012

(22) Filed: Dec. 20, 2022

(65) Prior Publication Data

US 2023/0120196 A1     Apr. 20, 2023

Related U.S. Application Data

(63) Continuation of application No. 16/923,950, filed on Jul. 8, 2020, now Pat. No. 11,564,148.

(51) Int. Cl.
*H04W 40/34* (2009.01)
*G05B 19/042* (2006.01)
(Continued)

(52) U.S. Cl.
CPC .......... *H04W 40/34* (2013.01); *G05B 19/042* (2013.01); *H04W 4/80* (2018.02); *H04W 76/10* (2018.02); *G05B 2219/2614* (2013.01)

(58) Field of Classification Search
CPC ....... H04W 40/34; H04W 4/80; H04W 76/10; G05B 19/042; G05B 2219/2614; G05B 2219/2642; H04L 12/66
See application file for complete search history.

(56) References Cited

U.S. PATENT DOCUMENTS

| | | | |
|---|---|---|---|
| 7,146,636 B2 * | 12/2006 | Crosbie | H04W 36/0011 726/19 |
| RE42,537 E | 7/2011 | Lin et al. | |

(Continued)

OTHER PUBLICATIONS

Hussain et al., "SeamBlue: Seamless Bluetooth Low Energy Connection Migration for Unmodified IoT Devices", Feb. 2017: 12 pages.

(Continued)

*Primary Examiner* — Joseph E Avellino
*Assistant Examiner* — Anindita Sen
(74) *Attorney, Agent, or Firm* — Womble Bond Dickinson (US) LLP

(57) ABSTRACT

Methods and related systems for operating a climate control system for an indoor space are disclosed. In an embodiment, the method includes establishing a connection between a device and a hub of the climate control system along a first signal pathway, wherein at least a portion of the first signal pathway comprises a short-range radio connection between the device and a first component of the system. In addition, the method includes monitoring one or more parameters of the first signal pathway and one or more parameters of a second signal pathway extending between the device and the hub, wherein at least a portion of the second signal pathway comprises a short-range radio connection between the device and a second component of the system. Further, the method includes re-routing the connection between the portable device and the system hub from the first signal pathway to the second signal pathway.

16 Claims, 3 Drawing Sheets

(51) Int. Cl.
*H04W 4/80* (2018.01)
*H04W 76/10* (2018.01)

(56) References Cited

U.S. PATENT DOCUMENTS

| | | | |
|---|---|---|---|
| 8,848,513 B2* | 9/2014 | Das | H04L 67/1046 |
| | | | 370/219 |
| 9,137,723 B2* | 9/2015 | Maguire | H04L 65/80 |
| 9,778,114 B2* | 10/2017 | Honjo | G01J 5/04 |
| 9,924,342 B2* | 3/2018 | Logue | H04W 4/80 |
| 10,764,128 B2 | 9/2020 | Kozura et al. | |
| 11,768,004 B2 | 9/2023 | Sinha et al. | |
| 2003/0036386 A1 | 2/2003 | Harrison | |
| 2004/0077349 A1 | 4/2004 | Barak et al. | |
| 2014/0031991 A1* | 1/2014 | Bergman | G05D 23/1905 |
| | | | 700/276 |
| 2014/0270306 A1 | 9/2014 | Luna et al. | |
| 2015/0032264 A1* | 1/2015 | Emmons | F24F 11/0001 |
| | | | 700/276 |
| 2016/0209059 A1 | 7/2016 | Castillo et al. | |
| 2016/0373909 A1* | 12/2016 | Rasmussen | H04W 4/80 |
| 2019/0089717 A1 | 3/2019 | Dolev et al. | |
| 2019/0346170 A1* | 11/2019 | Benefield | G01N 1/2273 |
| 2019/0390977 A1 | 12/2019 | Frader-Thompson et al. | |
| 2020/0133214 A1 | 4/2020 | Quam et al. | |
| 2022/0015009 A1* | 1/2022 | Garrett | G05B 19/042 |

OTHER PUBLICATIONS

Baucas et al., "IoT-Based Smart Home Device Monitor Using Private Blockchain Technology and Localization", School of Engineering, University of Guelph, Canada. Mar. 2021, 4 pages.

Dheere et al., Wireless Signal Strength Analysis in a Home Network, Proceeding of 2018 IEEE International Conference on Current Trends toward Converging Technologies, Coimbatore, India, 2018, 6 pages.

Chi et al., "Parallel Inclusive Communication for Connecting Heterogeneous IoT Devices at the Edge", Sen-Sys'19, New York, NY, USA, Nov. 10-13, 2019, 14 pages.

* cited by examiner

SYSTEMS AND METHODS FOR SEAMLESSLY TRANSFERRING A RADIO CONNECTION BETWEEN COMPONENTS OF A CLIMATE CONTROL SYSTEM

CROSS-REFERENCE TO RELATED APPLICATIONS

This application claims priority to U.S. patent application Ser. No. 16/923,950, filed Jul. 8, 2020, entitled "SYSTEMS AND METHODS FOR SEAMLESSLY TRANSFERRING A RADIO CONNECTION BETWEEN COMPONENTS OF A CLIMATE CONTROL SYSTEM". The foregoing application is hereby incorporated by reference herein, in its entirety and for all purposes.

STATEMENT REGARDING FEDERALLY SPONSORED RESEARCH OR DEVELOPMENT

Not applicable.

BACKGROUND

Climate control systems, such as heating, ventilation, and/or air conditioning (HVAC) systems may generally be used in residential and/or commercial areas for heating and/or cooling an indoor space to create comfortable temperatures inside those areas. Some climate control systems may be split-type air conditioning or heat pump systems. These systems typically have an indoor unit and an outdoor unit which are capable of cooling a comfort zone by operating in a cooling mode for transferring heat from a comfort zone to an ambient zone using a refrigeration cycle. Heat pump systems are also generally capable of reversing the direction of refrigerant flow through the components of the climate control system so that heat is transferred from the ambient zone to the comfort zone, thereby heating the comfort zone.

BRIEF SUMMARY

Some embodiments disclosed herein are directed to a method for operating a climate control system for an indoor space. In an embodiment, the method includes establishing a connection between a portable device and a system hub of the climate control system along a first signal pathway extending between the portable device and the system hub, wherein at least a portion of the first signal pathway comprises a short-range radio connection between the portable device and a first component of the climate control system. In addition, the method includes monitoring one or more parameters of the first signal pathway and one or more parameters of a second signal pathway extending between the portable device and the system hub, wherein at least a portion of the second signal pathway comprises a short-range radio connection between the portable device and a second component of the climate control system. Further, the method includes re-routing the connection between the portable device and the system hub from the first signal pathway to the second signal pathway in response to a change in at least one of the parameters of at least one of the first signal pathway and the second signal pathway, wherein the second component is connected to the first component by a wired communication bus of the climate control system and wherein at least a portion of the communication bus is disposed in the indoor space.

Other embodiments disclosed herein are directed towards a climate control system for an indoor space. In an embodiment, the climate control system includes a plurality of components comprising a system hub of the climate control system and at least one of an indoor unit and an outdoor unit of the climate control system, wherein the system hub is connected to at least one other component of the plurality of components by a wired communication bus of the climate control system which is at least partially disposed in the indoor space. In addition, the climate control system includes a non-transitory machine-readable medium including instructions that, when executed by a processor, cause the processor to establish a connection between a portable device and the system hub along a first signal pathway extending between the portable device and the system hub, wherein at least a portion of the first signal pathway comprises a short-range radio connection between the portable device and a first component of the plurality of components, wherein the first component comprises at least one of the system hub, the indoor unit, and the outdoor unit. Additionally, the instructions, when executed by the processor, cause the processor to monitor one or more parameters of the first signal pathway and one or more parameters of a second signal pathway extending between the portable device and the system hub, wherein at least a portion of the second signal pathway comprises a short-range radio connection between the portable device and a second component of the plurality of components, wherein the second component comprises at least one of the system hub, the indoor unit, and the outdoor unit. Further, the instructions, when executed by the processor, cause the processor to re-route the connection between the portable device and the system hub from the first signal pathway to the second signal pathway in response to a change in at least one of the parameters of at least one of the first signal pathway and the second signal pathway.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
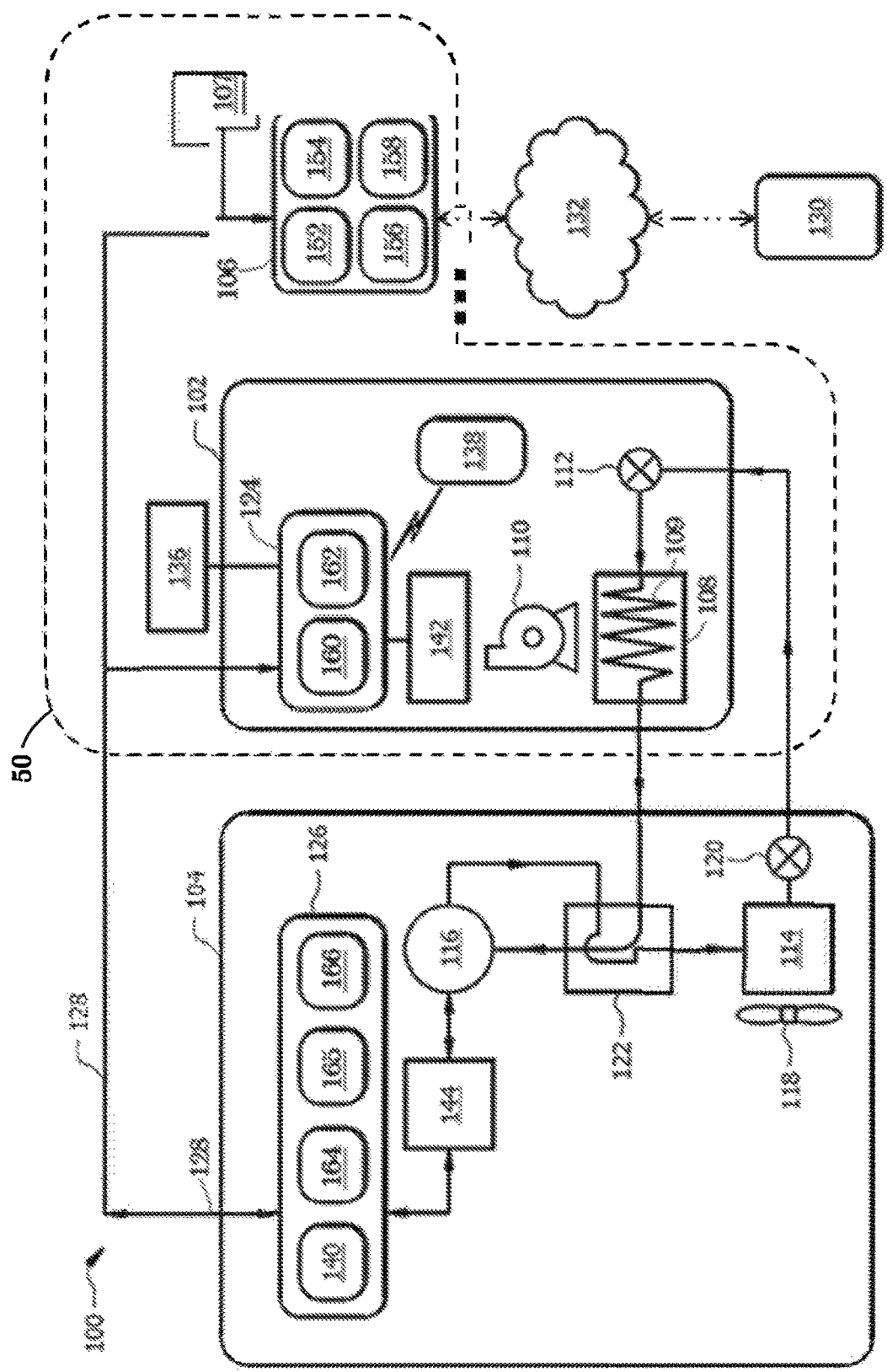
FIG. 1 is a schematic diagram of a HVAC system configured for operating in a cooling mode according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

Climate control systems may include one or more components configured for wireless communication with an electronic device, including electronic portable devices such as smartphones, tablet computers, laptops, etc. In one example, a user of the climate control system may establish a radio or radio frequency (RF) connection or link between one or more RF-enabled components of the climate control system and the electronic portable device whereby the user may receive (via the electronic portable device) information from the one or more RF-enabled components pertaining to the climate control system or to pass requests to the one or more RF-enabled components from the electronic device. In some applications, the radio connection between the portable device and the one or more RF-enabled components of the climate control system may comprise a short-range radio connection or link which, as used herein, refers to a radio connection established between short-range devices (SRDs) having an effective radiated power (ERO) of less than 500 milliwatts (mVV).

In some applications, the range of the short-range radio connection between a particular RF-enabled component of the climate control system and the portable device may be smaller than the overall area or footprint over which the climate control system is located. For instance, the range of the short-range radio connection may be less than the distance between the particular RF-enabled component and each of the other components of the climate control system, such as an indoor unit and an outdoor unit of the climate control system. Additionally, the quality of the short-range radio connection between the particular RF-enabled component and the electronic portable device may degrade (e.g., packet loss may increase, etc.) as the amount of signal interference increases in response to increasing physical distance between the RF-enabled component and the electronic portable device. Thus, a user of the climate control system may not be able to maintain signal connectivity with a particular RF-enabled component if the user physically travels to locations within the footprint of the climate control system but outside the range of the short-range radio connection between the portable device and the particular RF-enabled component. For example, a technician servicing the climate control system may lose signal connectivity with a RF-enabled component of the climate control system positioned proximal an indoor unit of the climate control system when the technician travels to a location proximal an outdoor unit of the climate control system and outside the range of the short-range radio connection between the technician's portable device and the RF-enabled component. Moreover, the quality of the connection between the RF-enabled component positioned proximal the indoor unit and the electronic portable device carried by the technician may degrade as the technician travels to the location proximal the outdoor unit due to increasing distance between the RF-enabled component and the indoor unit as well as the presence of obstructions between the RF-enabled component and the indoor unit once the technician is located proximal the outdoor unit. Thus, the technician may be unable to access information using the RF-enabled component when the technician is physically servicing the outdoor unit.

Accordingly, embodiments disclosed herein include systems and methods for seamlessly migrating or re-routing a wireless connection with an electronic portable device between a plurality of components of a climate control system. Particularly, embodiments disclosed herein include systems and methods for establishing a connection between a portable device and a system hub of the climate control system along a first signal pathway extending between the portable device and the system hub, wherein at least a portion of the first signal pathway comprises a short-range radio connection between the portable device and a first component of the climate control system. Additionally, embodiments disclosed herein include monitoring one or more parameters of the first signal pathway and one or more parameters of a second signal pathway between the portable device and the system hub, wherein at least a portion of the second signal pathway comprises a short-range radio connection between the portable device and a second component of the climate control system. Further, embodiments disclosed herein may include re-routing the connection between the portable device and the system hub from the first signal pathway to the second signal pathway in response to a change in at least one of the parameters of at least one of the first signal pathway and the second signal pathway.

As used herein, the term "re-route" is defined herein as the transferring of a connection established between a device (e.g., a portable device) and a component of a system (e.g., a system hub of a climate control system) from a first signal pathway extending between the device and the component to a second signal pathway extending between the device and the component and which is different from the first signal pathway. Thus, a connection established between the device and the component of the system may be "re-routed" from the first signal pathway to the second pathway. As will be described in more detail below, the device and/or the component of the system may be configured for performing the re-routing of the connection between the device and the component of the system. Also as will be described in more detail below, use of the embodiments disclosed herein may allow for signal connectivity to be maintained between a portable device and a system hub of a climate control system as a user of the portable device physically travels into and out of range of a plurality of RF-enabled components of the climate control system. Additionally, the user may neither be required to perform any action nor even be notified of the re-routing of the connection between the portable device and the system hub of the climate control system.

Referring now to FIG. 1, a schematic diagram of a climate control system 100 for an indoor space 50 according to some embodiments is shown. In this embodiment, climate control system 100 is a HVAC system, and thus, system 100 may be referred to herein as HVAC system 100. In the illustrated embodiment, HVAC system 100 comprises a heat pump system that may be selectively operated to implement one or more substantially closed thermodynamic refrigeration cycles to provide a cooling functionality (hereinafter "cooling mode"), and/or a heating functionality (hereinafter "heating mode"). In other embodiments, the HVAC system may comprise an air conditioner that provides cooling through use of the refrigeration cycle and/or a furnace that provides heating through combustion of a fuel (e.g., natural gas). The HVAC system 100, configured as a heat pump system, may comprise an indoor unit 102, an outdoor unit 104, and a system hub or controller 106 that may generally control communication of signals and/or data between various components of HVAC system 100. In some embodiments, system hub 106 may also control operation of the indoor unit 102 and/or the outdoor unit 104; however, in other embodiments, a hub or controller separate and distinct from system hub 106 may generally control the operation of indoor unit 102 and/or outdoor unit 104, the separate hub being in signal communication with system hub 106 via communication bus 128. Additionally, system hub 106 may be integrated into one or more components of HVAC system 100, such as indoor unit 102, outdoor unit 104, a thermostat comprising a temperature sensor and/or a user interface, etc. Further, in some embodiments, HVAC system 100 may comprise a packaged HVAC system that includes the function of the indoor unit 102 in a package located outdoors. Indoor unit 102 and at least a portion of communication bus 128 may be positioned in the indoor space 50. Additionally, in some embodiments, other components of HVAC system 100, including system hub 106 may be positioned in the indoor space 50.

Indoor unit 102 generally includes an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. Specifically, indoor heat exchanger 108 may include a coil 109 for channeling the refrigerant therethrough that segregates the refrigerant from any air flowing through indoor heat exchanger 108 during operations.

The indoor fan 110 may generally comprise a centrifugal blower comprising a blower housing, a blower impeller at least partially disposed within the blower housing, and a blower or fan motor configured to selectively rotate the blower impeller. The indoor fan 110 may generally be configured to provide airflow through the indoor unit 102 and/or the indoor heat exchanger 108 (specifically across or over the coil 109) to promote heat transfer between the airflow and a refrigerant flowing through the coil 109 of the indoor heat exchanger 108. The indoor fan 110 may also be configured to deliver temperature-conditioned air from the indoor unit 102 to one or more areas and/or zones of the indoor space 50.

The indoor metering device 112 may generally comprise an electronically-controlled motor-driven electronic expansion valve (EEV), a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112. In embodiments where the HVAC system is not configured as a heat pump system, the indoor unit of the HVAC system may comprise a furnace.

Outdoor unit 104 generally comprises an outdoor heat exchanger 114, a compressor 116, an outdoor fan 118, an outdoor metering device 120, a reversing valve 122, and an outdoor controller 126. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. While not specifically shown, it should be appreciated that outdoor heat exchanger 114 may include a coil similar to coil 109 previously described above for indoor heat exchanger 108.

The compressor 116 may generally be configured to selectively pump refrigerant at a plurality of mass flow rates through the indoor unit 102, the outdoor unit 104, and/or between the indoor unit 102 and the outdoor unit 104. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the outdoor heat exchanger 114.

The outdoor metering device 120 may generally comprise a thermostatic expansion valve, an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the HVAC system 100. Additionally, the reversing valve 122 may also be selectively controlled by the system hub 106.

The system hub 106 may generally be configured to communicate with an indoor controller 124 of the indoor unit 102, an outdoor controller 126 of the outdoor unit 104, and/or other components of the HVAC system 100. In some embodiments, the system hub 106 may be configured to control operation of the indoor unit 102 and/or the outdoor unit 104. In some embodiments, the system hub 106 may be configured to monitor and/or communicate, directly or indirectly, with a plurality of sensors associated with components of the indoor unit 102, the outdoor unit 104, etc. The sensors may measure or detect a variety of parameters, such as, for example, pressure, temperature, and flow rate of the refrigerant as well as pressure and temperature of other components or fluids of or associated with HVAC system 100. In some embodiments, the HVAC system 100 may include a sensor (or plurality of sensors) for sensing or detecting the ambient outdoor temperature. Additionally, in some embodiments, the system hub 106 may comprise a temperature sensor and/or may further be configured to control heating and/or cooling of zones associated with the HVAC system 100 (e.g., within the indoor space 50). As described above, in some embodiments, the system hub 106 may be configured as a thermostat, having a temperature sensor and a user interface, for controlling the supply of conditioned air to zones associated within the HVAC system 100.

The system hub 106 may be in communication with an input/output (I/O) unit 107 (e.g., a graphical user interface, a touchscreen interface, or the like), which may be combined with or remote from the system hub 106, for displaying information and for receiving user inputs. The I/O unit 107 may display information related to the operation of the HVAC system 100 (e.g., from system hub 106) and may receive user inputs related to operation of the HVAC system 100. During operations, the I/O unit 107 may communicate received user inputs to the system hub 106, which may then execute control of HVAC system 100 accordingly. The I/O unit 107 may also house sensors, such as temperature, humidity, and occupancy sensors for detecting conditions proximate to the I/O unit 107. Communication between the I/O unit 107 and system hub 106 may be wired, wireless, or a combination thereof. In some embodiments, communication between I/O unit 107 and system hub 106 may be across communication bus 128. In certain embodiments, the I/O unit 107 may further be operable to display information and receive user inputs tangentially and/or unrelated to operation of the HVAC system 100. In some embodiments, however, the I/O unit 107 may not comprise a display and may derive all information from inputs from remote sensors and remote configuration tools (e.g., remote computers, servers, smartphones, tablets, etc.). In some embodiments, system hub 106 may receive user inputs from remote configuration tools, and may further communicate information relating to HVAC system 100 to I/O unit 107. In these embodiments, system hub 106 may or may not also receive user inputs via I/O unit 107.

In some embodiments, the system hub 106 may be configured for selective bidirectional communication over the communication bus 128. In some embodiments, at least a portion of the communication bus 128 may comprise a three-wire connection suitable for communicating messages between the system hub 106 and one or more of the HVAC system 100 components configured for interfacing with the communication bus 128. System hub 106 may comprise a bus interface 152 for providing a wired connection between system hub 106 and communication bus 128.

System hub 106 may also include a first wireless transceiver or radio 154 and a second wireless transceiver or radio 156, where each radio 154, 156 is generally configured for RF communication. In some embodiments, at least one of radios 154, 156 may comprise a Bluetooth or Bluetooth Low Energy (BLE) radio configured for wirelessly communicating with other BLE enabled devices in accordance with BLE protocols. In other embodiments, at least one of radios 154, 156 of system hub 106 may comprise a Z-Wave communications module or radio configured for communicating wirelessly with other devices according to the Z-Wave communication protocol developed by Zensys, Inc. In still other embodiments, at least one of radios 154, 156 may be configured for RF communication according to a protocol other than BLE and Z-Wave, such as a radio configured for RF communication under at least one of the ZigBee, Insteon, RedLINK™, etc., protocols. Additionally, second radio 156 of system hub 106 may comprise a radio configured for RF communication according to a protocol other than the protocol of first radio 154, thereby providing system hub 106 with the ability to wirelessly communicate simultaneously with multiple devices using multiple RF protocols.

Further, the system hub 106 may be configured to selectively communicate with a remote device 130 via a communication network 132. In some embodiments, the communication network 132 may comprise the Internet, and the remote device 130 may comprise a smartphone and/or other Internet-enabled mobile telecommunication device. In other embodiments, the communication network 132 may also comprise a remote server. System hub 106 may include a network interface 158 to provide long-range wireless connectivity between system hub 106 and communication network 132.

The indoor controller 124 may be carried by the indoor unit 102 and may generally be configured to receive information inputs, transmit information outputs, and/or otherwise communicate with the system hub 106, the outdoor controller 126, and other components of HVAC system 100 via the communication bus 128. Indoor controller 124 may include a bus interface 160 for providing a connection between indoor controller 124 and communication bus 128. In some embodiments, the indoor controller 124 and/or system hub 106 may comprise information related to the identification and/or operation of the indoor unit 102; however, in other embodiments, indoor controller 124 may communicate with an indoor personality module which comprises information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 and/or the system hub 106 may be configured to communicate with an indoor fan controller 142 in signal communication with the motor of indoor fan 110 and/or otherwise affect control over operation of the indoor fan 110. In some embodiments, indoor controller 124 may comprise information related to the identification and/or operation of the indoor unit 102 and/or a position of the outdoor metering device 120.

The system hub 106 may be configured to receive information regarding temperatures and/or pressures of the refrigerant in the indoor unit 102. More specifically, the system hub 106 may be configured to receive information regarding temperatures and pressures of refrigerant entering, exiting, and/or within the indoor heat exchanger 108 from the indoor EEV controller 138. System hub 106 may affect control over the indoor metering device 112 when the indoor metering device 112 is an EEV using the indoor EEV controller 138 which may be configured to communicate directly with the indoor metering device 112.

Indoor controller 124 may also include a wireless transceiver or radio 162 generally configured for RF communication. In some embodiments, radio 162 may comprise a BLE radio communicable in accordance with the BLE protocol. In other embodiments, radio 162 may be configured for RF communication according to a protocol other than BLE such as Z-Wave, ZigBee, Insteon, RedLINK™, etc., protocols. Additionally, radio 162 of indoor controller 124 may be configured for RF communication according to the same protocol as the first radio 154 of system hub 106. For instance, radios 154, 162 may each comprise BLE radios configured for radio communication according to the BLE protocols.

The outdoor controller 126 may be carried by the outdoor unit 104 and may be configured to receive information inputs, transmit information outputs, and/or otherwise communicate with the system hub 106, the indoor controller 124, and other components of HVAC system 100 via the communication bus 128. Outdoor controller 126 may include a bus interface 164 for providing a connection between outdoor controller 126 and communication bus 128. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

Outdoor controller 126 may also include a pair of wireless transceivers or radios 165, 166 generally configured for RF communication. In some embodiments, at least one of radios 165, 166 may comprise a BLE radio communicable in accordance with the BLE protocol. In other embodiments, at least one of radios 165, 166 may be configured for RF communication according to a protocol other than BLE such as Z-Wave, ZigBee, Insteon, RedLINK™, etc., protocols. Additionally, at least one of the radios 165, 166 of outdoor controller 126 may be configured for RF communication according to the same protocol as the first radio 154 of system hub 106. For instance, radio 154 and at least one of radios 165, 166 may comprise BLE radios configured for radio communication according to the BLE protocols.

System hub 106, indoor controller 124, outdoor controller 126, compressor drive controller 144, indoor fan controller 142, and indoor EEV controller 138 may each comprise any suitable device or assembly which is capable of receiving electrical (or other data) signals and transmitting electrical (or other data) signals to other devices. In particular, while not specifically shown, system hub 106 and controllers 124, 126, 138, 142, and 144 may each include a processor and a memory. The processors (e.g., microprocessor, central processing unit, or collection of such processor devices, etc.) may execute machine readable instructions (e.g., non-transitory machine readable medium) provided on the corresponding memory to provide the processor with all of the functionality described herein. The memory of system hub 106 and each controller 124, 126, 138, 142, and 144 may comprise volatile storage (e.g., random access memory), non-volatile storage (e.g., flash storage, read only memory, etc.), or combinations of both volatile and non-volatile storage. Data consumed or produced by the machine readable instructions can also be stored on the memory of system hub 106 and controllers 124, 126, 138, 142, and 144.

Information related to the identification and operation of HVAC system 100, including information related to the identification and/or operation of both indoor unit 102 and outdoor unit 104, may be communicated from controllers 124, 126 to system hub 106 and stored in a database of system hub 106. The database stored in the memory of system hub 106 may comprise, for example, information related to a speed and torque of indoor fan 110, a volumetric flow-rate of indoor fan 110, a position of metering devices 112, 120 and reversing valve 122, information regarding temperatures and pressures of refrigerant flowing through heat exchangers 138, 144, information related to an ambient temperature of outdoor unit 104 and temperatures of outdoor heat exchanger 114 and compressor 116, as well as other information related to HVAC system 100. Thus, instead of having information related to the identification and operation of HVAC system 100 stored in locations distributed between system hub 106, indoor controller 124, outdoor controller 126, and/or other controllers of HVAC system 100 (e.g., outdoor personality 140, etc.), in some embodiments, substantially all data or captured information related to the identification and operation of HVAC system 100 may be centrally located in the database of system hub 106.

During operation, system hub 106 may generally control the operation of HVAC system 100 through the indoor controller 124, outdoor controller 126, compressor drive controller 144, indoor fan controller 142, and indoor EEV controller 138 (e.g., via communication bus 128). In the description below, specific control methods are described (e.g., method 300). It should be understood that the features of these described methods may be performed (e.g., wholly or partially) by system hub 106, and/or by one or more of controllers 124, 126, 138, 142, and 144 as directed by system hub 106. As a result, the hub and controllers of HVAC system 100 (e.g., system hub 106 and controllers 124, 126, 138, 142, and 144, etc.) may include and execute machine-readable instructions (e.g., non-volatile machine readable instructions) for performing the operations and methods described in more detail below. In some embodiments, system hub 106 and each of the controllers 124, 126, 138, 142, and 144 may be embodied in a singular control unit, or may be dispersed throughout the hub 106 and individual controllers 124, 126, 138, 142, and 144 as described above.

As shown in FIG. 1, the HVAC system 100 is configured for operating in a so-called cooling mode in which heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant through the reversing valve 122 and to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant may flow through and/or bypass the outdoor metering device 120, such that refrigerant flow is not substantially restricted by the outdoor metering device 120. Refrigerant generally exits the outdoor metering device 120 and flows to the indoor metering device 112, which may meter the flow of refrigerant through the indoor metering device 112, such that the refrigerant downstream of the indoor metering device 112 is at a lower pressure than the refrigerant upstream of the indoor metering device 112. From the indoor metering device 112, the refrigerant may enter the indoor heat exchanger 108. As the refrigerant is passed through coil 109 of the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow to the reversing valve 122, where the reversing valve 122 may be selectively configured to divert the refrigerant back to the compressor 116, where the refrigeration cycle may begin again.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may re-enter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
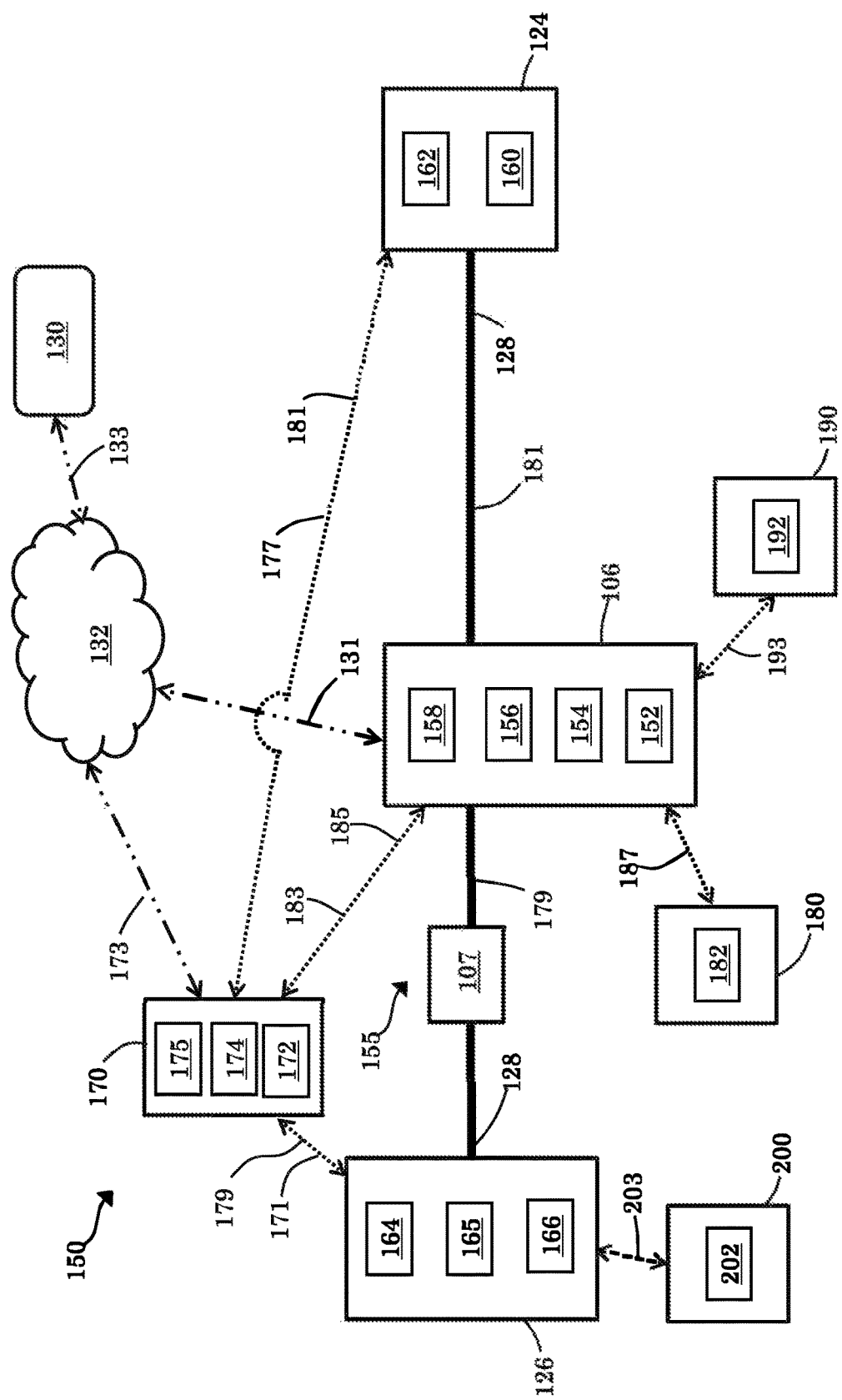
FIG. 2 is a schematic diagram of a network topology of the HVAC system of FIG. 1 according to some embodiments.

Referring to FIG. 2, a network architecture or topology 150 of the HVAC system 100 of FIG. 1 is shown in FIG. 2. Network topology 150 may include the communication bus 128 for providing communication between the indoor controller 124, the I/O unit 107, the outdoor controller 126, and system hub 106. As described above with respect to FIG. 1, system hub 106 includes bus interface 152 for providing a connection between system hub 106 and communication bus 128, radios 154, 156, and network interface 158.

Network interface 158 may comprise an Internet interface configured to provide internet connectivity to system hub 106. For instance, network interface 158 may comprise a wireless transceiver configured to provide a Wi-Fi connection (indicated schematically by arrow 131 in FIG. 2) between system hub 106 and communication network 132 in accordance with the specifications from the Institute of Electrical and Electronics Engineers' (IEEE) 802.11 standards. In other embodiments, network interface 158 may provide internet connectivity to system hub 106 via a wired connection. The remote device 130 described above with respect to FIG. 1 may also comprise a wireless transceiver or network interface for establishing a wireless link (indicated by arrow 133 in FIG. 2) with communication network 132. As described above, network topology 150 of HVAC system 100 comprises a combined or hybrid wired (e.g., via the connection provided by communication bus 128) and wireless (e.g., via the wireless connections provided by radios 154, 156 of system hub 106) topology.

Network topology 150 of HVAC system 100 may also include an electronic portable device 170 directly communicable with HVAC system 100. Unlike remote device 130 which is positioned remote from HVAC system 100 and may only communicate with HVAC system 100 via network 132, electronic portable device 170 is positioned proximal HVAC system 100 and may communicate directly with components of HVAC system 100, as will be described further herein. In some embodiments, portable device 170 may comprise a smartphone, tablet computer, laptop computer, and other portable computing/telecommunication devices. Portable device 170 may include an input/output (I/O) interface 172 (e.g., a graphical user interface, a touchscreen interface, or the like), a first wireless transceiver or radio 174, and a second wireless transceiver or network interface 175 to provide long-range wireless connectivity between portable device 170 and the communication network 132. Network interface 175 of portable device 170 may comprise an Internet interface configured to provide wireless internet connectivity, such as a Wi-Fi connection (indicated schematically by arrow 173 in FIG. 2), to portable device 170. Additionally, portable device 170 may include a memory and a processor (e.g., microprocessor, central processing unit, or collection of such processor devices, etc.) for executing machine readable instructions (e.g., non-transitory machine readable medium).

In some embodiments, radio 174 of portable device 170 may comprise a BLE radio configured for RF communication in accordance with the BLE protocols. For example, radio 174 of portable device 170 may establish a first bi-directional BLE radio link (indicated schematically by arrow 171 in FIG. 2) with the first radio 165 of outdoor controller 126 whereby signals and/or data may be communicated wirelessly between portable device 170 and outdoor controller 126. In other embodiments, radio 174 may be configured for RF communication according to a protocol other than BLE such as Z-Wave, ZigBee, Insteon, RedLINK™, etc., protocols. Radio 174 of portable device 170 may also similarly establish bi-directional short-range (e.g., BLE) radio links with radios 154, 165 of system hub 106 and outdoor controller 126, respectively. In some embodiments, radios 154, 162, 165, 166, may comprise SRDs having an ERO of less than 500 mW As will be described further herein, system hub 106 or portable device 170 may automatically and seamlessly control the management of the wireless link or connection formed between portable device 170 and the radios of HVAC system 100.

For example, in response to relative physical movement between portable device 170 and radios 154, 162, and 165, system hub 106 or portable device 170 may re-route a connection established between portable device 170 and system hub 106 along a first signal pathway 179 extending between the portable device 170 and the system hub 106 to a second signal pathway 181 extending between the portable device 170 and the system hub 106 and that is different from the first signal pathway 180. For example, the first signal pathway 179 between portable device 170 and system hub 106 may comprise the first BLE radio link 171 between radio 174 of portable device 170 and first radio 165 of outdoor controller 126, and the wired connection provided by communication bus 128 between the bus interface 164 of outdoor controller 126 and the bus interface 152 of system hub 106. The second signal pathway 181 between portable device 170 and system hub 106 may comprise a second bi-directional BLE radio link 177 established between the radio 174 of portable device 170 and the radio 162 of outdoor indoor controller 124, and the wired connection provided by communication bus 128 between the bus interface 160 of indoor controller 124 and the bus interface 152 of system hub 106.

System hub 106 or portable device 170 may perform the re-routing of the connection between the portable device 170 and system hub 106 automatically whereby no action by a user of portable device 170 is required to perform the re-routing from the first signal pathway 179 to the second signal pathway 181. System hub 106 or portable device 170 may also perform the re-routing of the connection between the portable device 170 and system hub 106 seamlessly whereby no indication of the re-routing is provided to the user of portable device 170 as the re-routing from the first signal pathway 179 to the second signal pathway 181 is being made. Further, in addition to the first and second signal pathways 179, 181 described above, portable device 170 or system hub 106 may re-route the connection between the portable device 170 and system hub 106 from one of the first and second signal pathways 179, 181, to a third signal pathway 183 extending directly between portable device 170 and system hub 106. Particularly, third signal pathway 183 may comprise a third bi-directional BLE radio link 185 between the radio 174 of portable device 170 and one of the radios 154, 156 of system hub 106. Thus, a signal pathway connecting portable device 170 with system hub 106 may comprise both wireless and wired connections (e.g., first and second signal pathways 179, 181) or only one or more wireless connections (e.g., third signal pathway 183).

Network topology 150 may further include a plurality of accessories 180, 190, and 200 of HVAC system 100, each accessory 180, 190, and 200 communicable with at least one of the system hub 106 and controllers 124, and 126 of HVAC system 100. Accessories 180, 190, and 200 of HVAC system 100 may be controllable through I/O unit 107 and/or portable device 170. For instance, accessory 180 may comprise a ceiling fan controllable by a user of HVAC system 100 (e.g., a homeowner, an installer of HVAC system 100, and/or a technician equipped to service HVAC system 100) using I/O unit 107 and/or portable device 170. Additionally, accessories 180, 190, and 200 may comprise other types of components communicable with system hub 106 and controllers 124, and 126 of HVAC system 100. For example, accessory 190 may comprise an indoor sensor for measuring relative humidity and temperature (RHT) in an area or zone of the indoor space 50. Additionally, accessory 200 may comprise an outdoor sensor for measuring RHT, as well as other types of sensors or other accessories (e.g., a wireless scale, a ceiling fan, a wirelessly controllable lighting fixture, etc.) communicable with at least one of system hub 106 and controllers 124, and 126. In some embodiments, the database stored in the memory of system hub 106 may comprise information related to the identification and operation of accessories 180, 190, and 200.

Each accessory 180, 190, and 200 of HVAC system 100 may include a wireless transceiver or radio 182, 192, and 202, respectively, for establishing a RF wireless connection with at least one of system hub 106 and controllers 124, and 126 of HVAC system 100. For example, radios 182, 192 of accessories 180, 190, respectively, may each comprise a Z-wave radio which may establish a Z-wave radio link (indicated schematically by arrows 187, 193, respectively, in FIG. 2) with the second radio 156 of system hub 106 according to the Z-Wave protocol. Alternatively, radios 182, 192 of accessories 180, 190, respectively, may each be configured for RF communication under at least one of the BLE, ZigBee, Insteon, RedLINK™, etc., protocols. Additionally, radio 202 of accessory 200 may comprise, for example, a BLE radio which may establish a bi-directional BLE radio link (indicated schematically by arrow 203 in FIG. 2) with the second radio 166 of outdoor controller 126 according to the BLE protocol. Alternatively, radios 202 of accessory 200 may be configured for RF communication under at least one of the Z-Wave, ZigBee, Insteon, RedLINK™, etc., protocols. Further, although HVAC system 100 is shown as including three accessories 180, 190, and 200 in FIG. 2, in other embodiments, HVAC system 100 may include varying number of accessories, including zero accessories, a single accessory, or more than three accessories. In this embodiment, outdoor controller 126 may connect simultaneously with both one of the accessories 180, 190, and 200 via second radio 166 and with portable device 170 via first radio 165; however, in other embodiments, outdoor controller 126 may not comprise second radio 166, and may instead connect simultaneously with both one of the accessories 180, 190, and 200 via first radio 165 where first radio 165 is configured for dual-mode operation whereby first radio 165 may act as both a client device and a peripheral device in accordance with, for example, Bluetooth Core Specification Version 4.1. Additionally, although indoor controller 124 is shown in FIGS. 1, 2 as including only a single radio 162, in other embodiments, indoor controller 124 may include two or more radios configured for configured for RF communication according to BLE, Z-Wave, ZigBee, Insteon, RedLINK™, etc., protocols.

Figure 3:
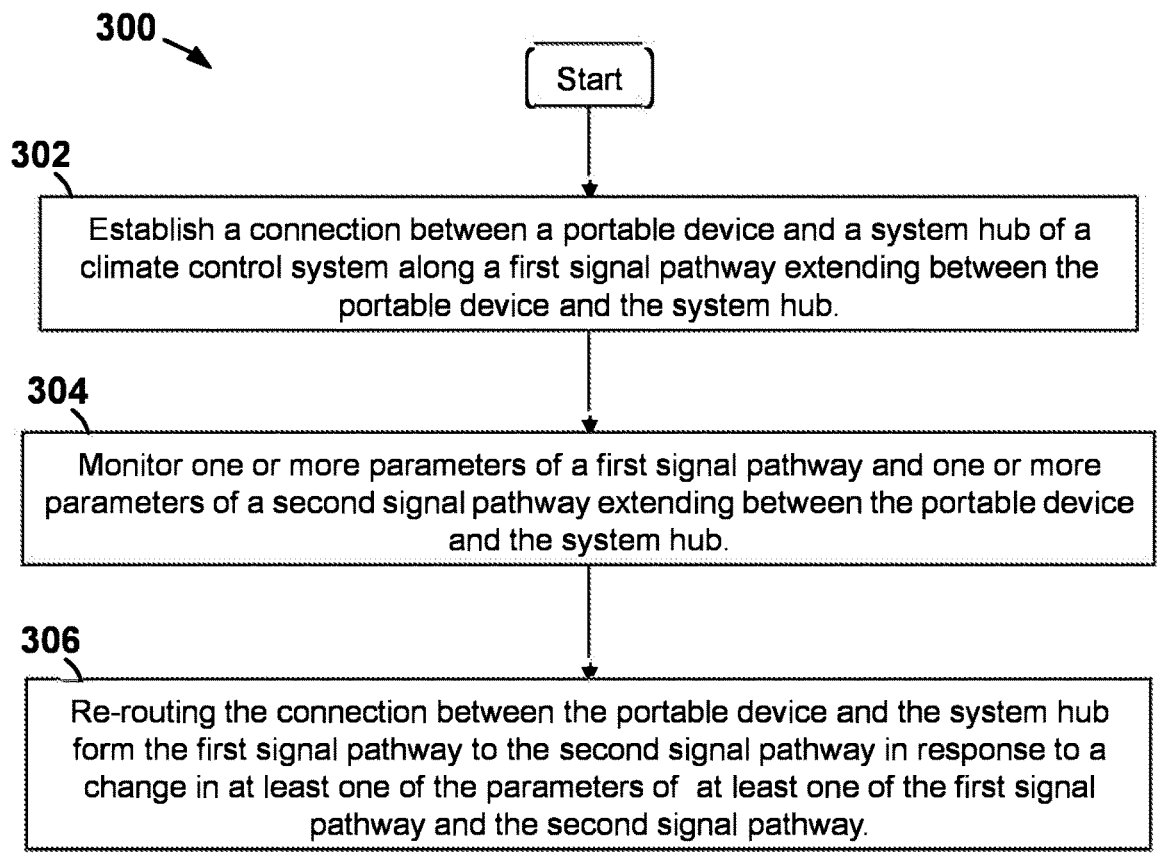
FIG. 3 is a flow chart of a method for seamlessly re-routing connection between a portable device and a climate control system according to some embodiments.

Referring now to FIGS. 1-3, a method 300 for seamlessly re-routing a connection between an electronic portable device and a climate control system is shown in FIG. 3. In some embodiments, method 300 may be practiced with HVAC system 100 as previously described above (see e.g., FIGS. 1, 2). Thus, in describing the features of method 300, continuing reference will made to the HVAC system 100 shown in FIGS. 1, 2; however, it should be appreciated that embodiments of method 300 may be practiced with other systems, assemblies, and devices.

Generally speaking, method 300 includes establishing a connection between a portable device (e.g., portable device 170) and a system hub of a climate control system (e.g., system hub 106 of HVAC system 100) along a first signal pathway (e.g., first signal pathway 179) extending between the portable device and the system hub. Method 300 may also generally include monitoring one or more parameters of the first signal pathway and one or more parameters of a second signal pathway (e.g., second signal pathway 181) extending between the portable device and the system hub. Method 300 may further include seamlessly re-routing the connection between the portable device and the system hub from the first signal pathway to the second signal pathway in response to a change in at least one of the parameters of at least one of the first signal pathway and the second signal pathway. As will be described in more detail below, performance of some or all of the steps of method 300 may be cyclical or repeated during the operational lifetime of the climate control system.

Initially, method 300 includes establishing a connection between a portable device and a system hub of a climate control system along a first signal pathway extending between the portable device and the system hub at method block 302. In some embodiments, the first signal pathway may comprise first signal pathway 179 and thus at least a portion of the first signal pathway may comprise a short-range radio connection (e.g., first BLE radio link 171) between the portable device and a first component of the climate control system (e.g., outdoor unit 104 of HVAC system 100). Method block 302 may comprise establishing a direct radio connection between portable device 170 and the outdoor unit 104 of HVAC system 100 via outdoor controller 126. For instance, portable device 170 may continuously scan for radio signals transmitted from one of the RF-enabled components of HVAC system 100 (e.g., system hub 106, indoor unit, outdoor unit 104, etc.) and may automatically request to establish a connection with system hub 106 along one of a plurality of signal pathways once at least one parameter of the signal pathway between the portable device 170 and system hub 106 reaches or exceeds a corresponding predetermined threshold stored which may be stored in the memory of portable device 170. In some embodiments, the threshold may pertain to a quality or strength of a signal transmittable along the signal pathway, such as a packet loss percentage along the signal pathway, and/or a data throughput of the signal pathway, such as a data transfer speed across the signal pathway. For example, in an embodiment, the threshold may comprise a Received Signal Strength Indicator (RSSI) value of approximately between −70 RSSI and −90 RSSI; however, in other embodiments, the threshold may vary.

In an example, as a user of portable device 170 (e.g., a homeowner, an installer of HVAC system 100, and/or a technician equipped to service HVAC system 100) enters into physical proximity with outdoor unit 104, software stored on portable device 170 may determine that at least one parameter of first signal pathway 179 exceeds the corresponding threshold and thus may request to establish a connection between portable device 170 and system hub 106 along first signal pathway 179 and may transmit a connection request using radio 174. In this example, the connection request may be received by outdoor controller 126 using first radio 165, and transmitted from outdoor controller 126 to system hub 106 using communication bus 128.

In other embodiments, system hub 106 may continuously scan for radio signals transmitted from RF-enabled portable devices (e.g., portable device 170) and may automatically request to establish a radio connection with the portable device along one of a plurality of signal pathways once at least one parameter of the signal pathway exceeds a corresponding predetermined threshold stored in the memory of system hub 106. In certain embodiments, the user of portable device 170 may confirm the connection request upon receiving the request from system hub 106. In still other embodiments, the user of portable device 170 may, using I/O interface 172, manually request to establish a connection between portable device 170 and system hub 106.

In some embodiments, system hub 106 may only connect with portable device 170 if the system hub 106 is configured to grant access to external devices, such as portable device 170, and if system hub 106 may authenticate the portable device attempting to obtain access to system hub 106. For example, a user of HVAC system 100 may first place (e.g., via entering a predefined code into I/O unit 107, etc.) HVAC system 100 into a configuration whereby system hub 106 is permitted to grant access to authenticated external devices.

Once HVAC system 100 is placed into a condition in which system hub 106 is authorized to grant access to external devices, the portable device 170 may transmit or provide, along with the connection request, a predefined code or encryption token to system hub 106. System hub 106 may validate the encryption token provided by the portable device 170 before the portable device 170 is permitted to connect to system hub 106 through the first signal pathway 179.

After validating the encryption token provided by the portable device 170, system hub 106 may permit portable device 170 to establish a connection between portable device 170 and system hub 106 along first signal pathway 179. Alternatively, system hub 106 may establish a connection between portable device 170 and system hub 106 after validating the encryption token provided by portable device 170. As part of one of the portable device 170 and system hub 106 establishing a connection between portable device 170 and system hub 106 along first signal pathway 179, one of portable device 170 and system hub 106 may establish a wireless connection across first BLE radio link 171.

In some embodiments, system hub 106 may control a transmission power level or state of each RF-enabled component of HVAC system 100. For example, system hub 106 may instruct each RF-enabled component of HVAC system 100 (e.g., controllers 124, 126, hub 106, etc.) to broadcast RF signals advertising the RF-enabled component's presence to portable devices within the vicinity of HVAC system 100 at a first or low power level prior to the establishing of a connection between a portable device (e.g., portable device 170) and system hub along one of the signal pathways (e.g., signal pathways 179, 181, 183) of HVAC system 100. Once a connection between a portable device and system hub 106 has been established along one of the signal pathways of HVAC system 100, system hub 106 may instruct each RF-enabled component of HVAC system 100 to broadcast RF signals advertising the RF-enabled component's presence at a second power level that is greater than the first power level (e.g., a maximum RF transmission power level for the RF-enabled component). Increasing the transmission power level for each RF-enabled component of HVAC system 100 following the establishment of a connection between a portable device and system hub 106 may help maintain signal connectivity between the portable device and system hub 106 while also maximizing the energy efficiency of HVAC system 100.

In some embodiments, system hub 106 may communicate a shared identifier to each RF-enabled component of HVAC system 100. Each RF-enabled component may broadcast the shared identifier as an RF signal when advertising the RF-enabled component's presence to portable devices within the vicinity of the HVAC system 100. By broadcasting the shared identifier, a portable device within range of the RF signals broadcasted by a plurality of RF-enabled components may determine that each RF-enabled component broadcasting the shared identifier belongs to the same particular climate control system (e.g., HVAC system 100 in this example). In applications where a portable device is within range of RF signals broadcasted by RF-enabled components of a plurality of separate climate control systems, a shared identifier broadcasted by each RF-enabled component of each separate climate control system may permit a user of the portable device to identify and connect with a desired climate control system of the plurality of climate control systems.

Depending upon the location of portable device 170 relative the RF-enabled components of HVAC system 100, portable device 170 may receive signals from a plurality of RF-enabled components (a separate signal pathway extending through each RF-enabled component) and at least one parameter of a plurality of the signal pathways (e.g., signal pathways 179, 181, 183) may equal or exceed a corresponding threshold. In such an event, the portable device 170 may establish a connection between portable device 170 and system hub 106 along each signal pathway that has at least one parameter which equals or exceeds the corresponding threshold. Additionally, the portable device 170 may compare the parameters of each signal pathway along which a connection is established between portable device 170 and system hub 106 and may designate as the active connection for transferring signals and/or data between the portable device 170 and system hub 106 the signal pathway having one or more parameters (e.g., signal quality, data throughput, etc.) which exceed one or more corresponding parameters of the other signal pathways. In some embodiments, the one or more parameters used to determine the designation of the active connection may comprise signal quality, data throughput, and/or a combination of the signal quality and data throughput of the signal pathways. For instance, the signal quality and data throughput may be individually weighted and the signal pathway having the greatest weighted average of signal quality and data throughput may provide the active connection between the portable device and the system hub 106.

For example, during the operation of HVAC system 100, the radios 154, 162, 165 of system hub 106 and controllers 124, 126, respectively, may continuously broadcast radio signals, some of which may be received by the radio 174 of portable device 170. As radios 154, 162, and 165 continuously broadcast radio signals, portable device 170 may determine one or more parameters of first signal pathway 179 (associated with outdoor unit 126) and second signal pathway 181 (associated with indoor unit 124), and compare the parameters of first and second signal pathways 179, 181 to identify the signal pathway having one or more parameters which exceed one or more corresponding parameters of the other signal pathways. For instance, portable device 170 may determine that the first signal pathway 179 has a greater signal quality and/or data throughput than the signal quality and data throughput of second signal pathway 181 and third signal pathway 183. Having identified the signal pathway having the one or more parameters which exceed the one or more corresponding parameters of the other signal pathways, portable device 170 may then designate as the active connection for transferring signals and/or data between the portable device 170 and system hub 106 the signal pathway having the greatest one or more parameters (e.g., the greatest signal quality, the greatest data throughput, the greatest weighted average of signal quality and data throughput etc.).

In the example described above where portable device 170 is positioned proximal outdoor controller 126, the signal received by portable device 170 from outdoor controller 126 along first signal pathway 179 may have one or more parameters (e.g., signal quality, data throughput, etc.) which exceed the one or more corresponding parameters of signal pathways 181, 183, and thus portable device 170 may designate first signal pathway 179 as the active connection for transferring signals and/or data between system hub 106 and portable device 170. The portable device 170 may also communicate the identity of the active connection (first signal pathway 179 in this example) to system hub 106 so that system hub 106 may use only the designated active connection for transmitting data to portable device 170. In some embodiments, the one or more parameters of each signal pathway determined by portable device 170 may comprise a determination of the power of the received signal for each signal pathway, such as the RSSI of the received signal; however, in other embodiments, the one or more parameters determined by the portable device 170 may vary. For example, the one or more parameters determined by portable device 170 may comprise received signal quality in decibel-milliwatts (dBm), or the received channel power indicator (RCPI) of the received signal for each signal pathway.

In other embodiments, upon system 106 confirming authorization of portable device 170 to connect with system hub 106, system hub 106—rather than portable device 170—may establish a connection between portable device 170 and system hub 106 along a signal pathway (e.g., signal pathways 179, 181, and 183) having at least one parameter which equals or exceeds the corresponding threshold. In the event that multiple signal pathways each have at least one parameter which equals or exceeds the corresponding threshold, system hub 106 may establish a connection between portable device 170 and system hub 106 along each signal pathway having at least one parameter which equals or exceeds the corresponding threshold. Additionally, system hub 106 may compare one or more parameters of each signal pathway and designate the signal pathway having the greatest one or more parameters (e.g., the greatest signal quality, data throughput, and/or a weighted average of signal quality and data throughput) as the active connection for transmitting signals and/or data between system hub 106 and portable device 170. System hub 106 may also communicate the identity of the active signal pathway (the first signal pathway 179 in this example) to portable device 170 so that portable device 170 may use only the designated active connection for transmitting data to system hub 106.

As an example, the user of portable device 170 may comprise a technician equipped to service HVAC system 100. The technician may service outdoor unit 104 and thus enter into proximity with outdoor unit 104 whereby a connection request is made by one of the portable device 170 and system hub 106 along first signal pathway 179. The technician may enter a predefined code matching a code stored in the memory of system hub 106 to obtain authorization to connect with system hub 106, permitting at least one of the portable device 170 and system hub 106 to then establish first BLE radio link 171 between portable device 170 and outdoor controller 126 of outdoor unit 106 along first signal pathway 179. Once connected to system hub 106 (the technician may selectably transmit data between system hub 106 and portable device 170 through the designated active connection (along first signal pathway 179 in this example). For example, via first signal pathway 179, the technician may access information (displayed on I/O interface 172 of portable device 170) from the database of system hub 106 related to the identification and/or operation of outdoor unit 104 such as, for example, the model of the outdoor fan 118, a speed of outdoor fan 118, the operational position of reversing valve 122, as well as other parameters of outdoor unit 104. The technician may also control the operation of one or more components (e.g., a speed of outdoor fan 118, for instance) using BLE radio link 171 of first signal pathway 179. However, in other embodiments, information related to the identification and/or operation of outdoor unit 104 may be stored locally in a memory of the outdoor controller 126 and portable device 170 may access this information directly from outdoor unit 104 and not from system hub 106. Thus, in some embodiments, information related to a particular component of HVAC system 100 (e.g., indoor unit 102, outdoor unit 104, etc.) may be accessed directly from the component and not from system hub 106 via the portion of the signal pathway extending between the component and portable device 170 (e.g., the first BLE radio link 171 of first signal pathway 179 in this example).

In addition to transmitting signals and/or data directly between portable device 170 and the outdoor controller 126 of outdoor unit 104, the technician may also transmit signals and/or data directly between portable device 170 and other components of HVAC system 100, including system hub 106 and controllers 124, and accessories 180, 190, and 200 via the first signal pathway 179. For example, while physically located proximal to outdoor unit 104, the technician operating portable device 170 may access information from the database of system hub 106 associated with, for example, indoor unit 102, such as the model of indoor fan 110, a speed of indoor fan 110, a flow rate of refrigerant through indoor unit 102, as well as other information pertaining to indoor unit 102. The technician may also control the operation of one or more components of indoor unit 102 (e.g., a speed of the indoor fan 110, for instance) through system hub 106 via the first signal pathway 179. In other words, in some embodiments, a radio connection between the portable device 170 and the outdoor controller 126 is not limited to manipulating the operation of or retrieving data relative to the outdoor unit 104.

Further, the technician may also access information from the database of system hub 106 pertaining to, or control the operation of, one or more of accessories 180, 190, and 200 via the first signal pathway 179. For instance, in an embodiment where accessory 180 comprises a ceiling fan, the technician may operate accessory 180 (e.g., turn the ceiling fan on or off) through system hub 106 by transmitting a control signal to outdoor controller 126 via the first signal pathway 179 and the radio link 187 established between accessory 180 and system hub 106. Thus, method 300 may include receiving information pertaining to one or more components of the climate control system on the portable device using a single signal pathway extending between the portable device and the system hub of the climate control system.

Signals transmitted to outdoor controller 126 from portable device 170, such as a request for information pertaining to outdoor unit 104 and/or indoor unit 102 are routed to system hub 106 from outdoor controller 126 along first signal pathway 179. Upon receiving the information request from portable device 170, system hub 106 may process the information request, retrieve the requested information from the database stored in the memory of system hub 106, and transmit the requested information along the first signal pathway 179 to portable device 170 where the requested information may be displayed to the technician using I/O interface 172. Thus, system hub 106 may comprise a data repository and central hub of network topology 150 configured to receive and process signals transmitted from portable device 170 and along a plurality of signal pathways extending between portable device 170 and system hub 106, including requests for information as well as commands issued by portable device 170 to various components of HVAC system 100, including system hub 106 and controllers 124, 126, and accessories 180, 190, and 200. In this configuration, RF-enabled components of HVAC system 100, such as system hub 106 and controllers 124, and 126 provide access points to a wired network 155 of network topology 150 comprising communication bus 128 and the components of HVAC system 100 wired to communication bus 128 (e.g., system hub 106 and controllers 124, 126).

In addition to the radio connectivity between portable device 170 and HVAC system 100 via signal pathways 179, 181, and 183, signals and/or data received by portable device 170 from HVAC system 100 may also be communicated wirelessly to communication network 132 using Wi-Fi connection 173. Particularly, desired data pertaining to one or more components of HVAC system 100, including units 102, 104 and accessories 180, 190, and 200 may be accessed from the database of system hub 106 by portable device 170 via one of the signal pathways 179, 181, and 183 extending between portable device 170 and system hub 106. Once portable device 170 has accessed the desired data from system hub 106 via one of the signal pathways 179, 181, and 183, portable device 170 may wirelessly communicate (e.g., via Wi-Fi connection 173) the desired data to communication network 132, where the desired data may be accessed or shared to other users via, for example, remote device 130. The desired data may also be stored in communication network 132, where communication network 132 may comprise a data reservoir including data pertaining to the various components of HVAC system 100.

Method 300 also includes monitoring one or more parameters of the first signal pathway and one or more parameters of a second signal pathway extending between the system hub and the portable device at method block 304. In some embodiments, the second signal pathway may comprise second signal pathway 181 and thus at least a portion of the second signal pathway may comprise a short-range radio connection (e.g., second BLE radio link 177) between the portable device and a second component of the climate control system (e.g., indoor unit 102 of HVAC system 100).

Method block 304 may comprise portable device 170 continuously monitoring the one or more parameters of the first and second signal pathways 179, 181 as the RF-enabled components of HVAC system 100 continuously broadcast radio signals during the operation of HVAC system 100 and while the portable device 170 is directly connected with at least one of the RF-enabled components of HVAC system 100 via one of the signal pathways extending between portable device 170 and system hub 106. In other embodiments, block 304 may comprise system hub 106 continuously monitoring the one or more parameters of the first and second signal pathways 179, 181 as portable device 170 continuously broadcasts radio signals while the portable device 170 is directly connected with at least one of the RF-enabled components of HVAC system 100 via one of the signal pathways extending between portable device 170 and system hub 106.

Method 300 further includes re-routing the connection between the portable device and the system controller from the first signal pathway to the second signal pathway in response to a change in at least one of the parameters of at least one of the first signal pathway and the second signal pathway at method block 306. In some embodiments, block 306 may comprise seamlessly re-routing the connection between the portable device 170 and the system hub 106 from the first signal pathway (e.g., first signal pathway 179) to the second signal pathway (e.g., signal pathway 181) in response to at least one of the parameters of the second signal pathway surpassing at least one of the parameters of the first signal pathway.

For example, during the operation of HVAC system 100, the user of portable device 170 may physically move or travel relative to the components (e.g., system hub 106 and controllers 124, and 126) of HVAC system 100. For instance, in an embodiment where the user of portable device 170 comprises a technician equipped to service HVAC system 100, first signal pathway 179 may originally be designated as the active connection between portable device 170 and system hub 106 as the technician services outdoor unit 104. However, once the outdoor unit 104 has been serviced, the technician may travel (along with portable device 170) from a first location proximal outdoor unit 104 to a second location proximal indoor unit 102 to service indoor unit 102. As the technician travels from the outdoor unit 104 towards the indoor unit 102, one or more parameters of the first signal pathway 179, such as a signal quality of the first signal pathway 179 (e.g., the quality of the signal received by radio 174 of portable device 170 from the radio 166 of outdoor controller 126), may degrade while one or more parameters of the second signal pathway 181, such as a signal quality of the second signal pathway (e.g., the quality of the signal received by radio 174 of portable device 170 from the radio 162 of indoor controller 124) may increase.

As the technician travels from outdoor unit 104 towards indoor unit 102 in this example, at least one of portable device 170 and system hub 106 may monitor (as described above at block 304 of method 300) the decrease in the one or more parameters of the first signal pathway 179 and the increase in the one or more parameters of the second signal pathway 181, and one of portable device 170 and system hub 106 may establish a connection between system hub 106 and portable device 170 along second signal pathway 181 once at least one of the parameters of the second signal pathway 181, such as a signal quality of the second signal pathway 181, equals or exceeds a signal quality threshold.

Although in this example portable device 170 or system hub 160 may establish a connection along the second signal pathway 181 once at least one parameter of the second signal pathway 181 equals or exceeds at least one corresponding threshold, the first signal pathway 179 will remain designated as the active connection for the transfer of data between portable device 170 and system hub 106 as long as each parameter of the first signal pathway 179 exceeds each parameter of the second signal pathway 181. However, once one or more parameters of the second signal pathway 181 (e.g., a signal quality and/or data throughput of the second signal pathway 181) exceeds one or more corresponding parameters of the first signal pathway 179, one of portable device 170 and system hub 106 may re-route the active connection between the portable device 170 and system hub 106 from the first signal pathway 179 to the second signal pathway 181 and designate the second signal pathway 181 as the active connection whereby data transmitted between portable device 170 and HVAC system 100 is transmitted through the second signal pathway 181 and not through the now "passive" or non-active connection along first signal pathway 179.

In some embodiments, the active connection between the portable device 170 and system hub 106 may be re-routed from the first signal pathway 179 to the second signal pathway 181 in response to a single parameter of the second signal pathway 181 surpassing a corresponding parameter of the first signal pathway 179. For example, the active connection may be re-routed from the first signal pathway 179 to the second signal pathway 181 in response to a signal quality of the second signal pathway 181 surpassing a signal quality of the first signal pathway 179. In other embodiments, the active connection may only be re-routed once multiple parameters of the second signal pathway 181 have surpassed multiple corresponding parameters of the first signal pathway 179. For example, the active connection may be re-routed from the first signal pathway 179 to the second signal pathway 181 in response to both a signal quality and a data throughput of the second signal pathway 181 surpassing a signal quality and a data throughput of the first signal pathway 179. In still other embodiments, the active connection may be re-routed from the first signal pathway 179 to the second signal pathway 181 in response to weighted average of a signal quality and a data throughput of the second signal pathway 181 surpassing a weighted average of a signal quality and a data throughput of the first signal pathway 179.

In some embodiments, at least one of portable device 170 and system hub 106 may initiate the re-routing of the active connection from the first signal pathway 179 to the second signal pathway 181 once one or more parameters of the second signal pathway 181 become a predetermined percentage greater than one or more corresponding parameters of the first signal pathway 179. For instance, portable device 170 may re-route the active connection from the first signal pathway 179 to the second signal pathway 181 in response to a quality of a signal (e.g., the RSSI of the signal received by portable device 170) of the second signal pathway 181 being approximately 10% to 50% greater than the quality of a signal (e.g., the RSSI of the signal received by portable device 170) of the first signal pathway 179; however, in other embodiments, the threshold difference between the one or more parameters of the first and signal pathways 179, 181 sufficient to trigger the re-routing of the active connection may vary.

For instance, referring now to FIGS. 1-3, at least one of portable device 170 and system hub 106 may re-route the active connection from the first signal pathway 179 to the second signal pathway 181 whereby signals and/or data transferred between portable device 170 and system hub 106 may cease being transferred across BLE radio link 171 (comprising a portion of the first signal pathway 179) and instead, following the re-routing, may be transferred across second BLE radio link 177 (comprising a portion of the second signal pathway 181). Given that the connection between portable device 170 and system hub 106 along second signal pathway 181 is established prior to the re-routing of the active connection to the second signal pathway 181, signal connectivity between portable device 170 and system hub 106 may be maintained as system hub 106 or portable device 170 re-routes the active connection from the first signal pathway 179 to the second signal pathway 181, minimizing data loss and/or other issues which may result from a loss of signal connectivity between portable device 170 and system hub 106.

The methodology of block 306 described above in the example of re-routing-off an active connection between portable device 170 and system hub 106 from the first signal pathway 179 to the second signal pathway 181 may be repeated for other signal pathways of HVAC system 100 as the technician controlling portable device 170 travels about the footprint of HVAC system 100. For instance, the technician may travel from the second location proximal indoor unit 102 to a third location proximal system hub 106 but distal indoor unit 102. As the technician travels along with portable device 170 from the second location to the third location, at least one of portable device 170 and system hub 106 may perform the steps described at blocks 304 and 306 of method 300 to automatically and seamlessly re-route the active connection between portable device 170 and system hub 106 from the second signal pathway 181 to the third signal pathway 183. Similarly, if the technician chooses to return to the first location proximal outdoor unit 104 from the third location proximal system hub 106, at least one of portable device 170 and system hub 106 may perform the steps described at blocks 304, 306 of method 300 to automatically and seamlessly re-route the active connection between portable device 170 and system hub 106 from the third signal pathway 183 to the first signal pathway 179.

In the manner described above, system hub 106 or portable device 170 may maintain signal connectivity with portable device 170 as long as portable device 170 remains within range of at least one RF-enabled component of HVAC system 100 (e.g., system hub 106 and controllers 124, and 126) whereby signal connectivity may be maintained between system hub 106 and portable device 170 along at least one signal pathway of HVAC system 100. Additionally, system hub 106 or portable device 170 may maintain signal connectivity between portable device 170 and system hub 106 without requiring an action to be performed by the user of portable device 170 as the user physically travels out of range of a first RF-enabled component of HVAC system 100 to which a radio connection (e.g., a BLE radio link) has been established and into range of a second RF-enabled component of HVAC system. Moreover, system hub 106 may maintain signal connectivity between portable device 170 and system hub 106 in a seamless manner whereby the connection between portable device 170 and system hub 106 may be migrated re-routed between a plurality of separate and distinct signal pathways comprising different RF-enabled components of HVAC system 100 (e.g., outdoor controller 126 for first signal pathway 179, indoor controller 124 for second signal pathway 181, etc.) without the user being notified (e.g., due to loss of signal integrity) of the re-routing having taken place.

Still referring to FIGS. 1-3, through use of the systems and methods described herein (e.g., HVAC system 100, method 300, etc.), signal connectivity may be maintained between a portable device of a user of a climate control system and a system hub of the climate control system as the user moves into, and out of, a range of a plurality of RF-enabled components of the climate control system whereby the user is neither required to perform any action nor even notified of re-routings of the connection between the portable device and the system hub of the climate control system. Specifically, a climate control system for an indoor space (e.g., HVAC system 100 for indoor space 50) may be operated to establish a connection between a portable device (e.g., portable device 170) and a system hub (e.g., system hub 106) of the climate control system along a first signal pathway (e.g., first signal pathway 179) extending between the portable device and the system hub. The climate control system may also be operated to monitor one or more parameters of the first signal pathway and one or more parameters of a second signal pathway (e.g., second signal pathway 181) extending between the portable device and the system hub. The climate control system may be further operated to re-route the connection between the portable device and the system hub in response to a change in at least one of the parameters of at least one of the first pathway and the second signal pathway. The climate control system may be operated to allow a user of the portable device to receive information pertaining to a plurality of components (e.g., system hub 106 and controllers 124, and 126, and accessories 180, 190, and 200) of the climate control system using the connection between the portable device and the system hub along one of the system pathways of the climate control system.

Additionally, at least one of a portable device (e.g., portable device 170) and a system hub (e.g., system hub 106) of the climate control system may be configured to establish a connection between the portable device and the system hub along a first signal pathway extending between the portable device and the system hub, monitor one or more parameters of the first signal pathway and one or more parameters of a second signal pathway extending between the portable device and the system hub, and re-route the connection, such as the active connection described above, from the first signal pathway to the second signal pathway in response to a change in at least one of the parameters of at least one of the first signal pathway and the second signal pathway.

Utilizing embodiments described herein, a connection formed between a portable device (e.g., portable device 170) and a system hub (e.g., system hub 106) of the climate control system may be automatically (not requiring an action to be performed by the user of the portable device) and seamlessly (not providing an indication to the user of the portable device indicative of re-routing) re-routed between a plurality of signal pathways (e.g., signal pathways 179, 181, and 183) of the climate control system whereby signal connectivity between the portable device and the system hub is maintained. Thus, the user may connect their portable device to the system hub of the climate control system along a first signal pathway and physically travel out of the range of a radio connection of the first signal pathway while maintaining signal connectivity with the climate control system as the system hub or portable device automatically and seamlessly re-routes the connection from the first signal pathway to the second signal pathway.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A computer-implemented method comprising:
   establishing a first connection between a portable electronic device and a first component of a heating, ventilation, and/or air conditioning (HVAC) system, wherein
   the first connection comprises a first wireless connection, and
   the first component of the HVAC system is configured to communicate with a second component of the HVAC system via a first signal pathway;
   providing communications between the portable electronic device and the second component of the HVAC system via a signal pathway, wherein the signal pathway comprises the first connection and the first signal pathway; and
   maintaining the communications between the portable electronic device and the second component of the HVAC system, wherein the maintaining comprises:

migrating the communications between the portable electronic device and the second component of the HVAC system to another signal pathway;

establishing a second connection between the portable electronic device and a third component of the HVAC system, wherein the second connection comprises a second wireless connection, and the third component of the HVAC system is configured to communicate with the second component of the HVAC system via a second signal pathway; and providing communication between the portable electronic device and the second component of the HVAC system via the another signal pathway, wherein the another signal pathway comprises the second connection and the second signal pathway.

2. The computer-implemented method of claim 1, wherein the maintaining further comprises;
re-routing communications between the first component of the HVAC system and the second component of the HVAC system to a third signal pathway.

3. The computer-implemented method of claim 1, wherein
the HVAC system comprises a plurality of components, ones of the plurality of components are in communication with one another via ones of a plurality of signal pathways, and
the first signal pathway comprises one or more other components of the plurality of components and one or more signal pathways of the plurality of signal pathways.

4. The computer-implemented method of claim 1, wherein the first signal pathway comprises a wired connection.

5. The computer-implemented method of claim 1, wherein
the first component of the HVAC system is one of a system hub, a furnace, an air conditioner, an indoor unit, an outdoor unit, or a thermostat, and
the second component of the HVAC system is another of the system hub, the furnace, the air conditioner, the indoor unit, the outdoor unit, or the thermostat.

6. The computer-implemented method of claim 1, further comprising:
establishing a third connection between another portable electronic device and the first component of the HVAC system, wherein the third connection comprises another wireless connection; and
maintaining the third connection during the migrating of the first connection.

7. The computer-implemented method of claim 6, wherein
the another signal pathway supports communications between the portable electronic device and the first component of the HVAC system.

8. The computer-implemented method of claim 1, wherein the first connection is maintained during the migrating.

9. The computer-implemented method of claim 1, wherein the another signal pathway does not include the first connection.

10. The computer-implemented method of claim 1, wherein the another signal pathway comprises:
a third connection directly between the portable electronic device and the second component of the HVAC system.

11. The computer-implemented method of claim 10, wherein
the first connection is the first wireless connection,
the third connection is a third wireless connection,
the portable electronic device maintains communication with the first component of the HVAC system via the third wireless connection, and
at least one of the first wireless connection or the third wireless connection is implemented using one of Bluetooth communications protocol or Bluetooth Low Energy communications protocol.

12. The computer-implemented method of claim 1, wherein
the first connection is the first wireless connection,
the HVAC system comprises a plurality of components, the plurality of components comprises the first component of the HVAC system and the second component of the HVAC system, and
the HVAC system is configured to support communications between the portable electronic device and each component of the plurality of components via the first connection.

13. The computer-implemented method of claim 12, wherein
the HVAC system comprises a plurality of components,
ones of the plurality of components are in communication with one another via ones of a plurality of signal pathways,
the first signal pathway comprises one or more other components of the plurality of components and one or more signal pathways of the plurality of signal pathways, and
the second signal pathway comprises at least one other component of the plurality of components and at least one other signal pathway of the plurality of signal pathways.

14. A computing system comprising:
one or more processors; and
a computer-readable storage medium coupled to the one or more processors, comprising program instructions, which, when executed by the one or more processors, perform a method comprising:
establishing a first connection between a portable electronic device and a first component of a heating, ventilation, and/or air conditioning (HVAC) system, wherein
the first connection comprises a first wireless connection, and
the first component of the HVAC system is configured to communicate with a second component of the HVAC system via a first signal pathway;
providing communications between the portable electronic device and the second component of the HVAC system via a signal pathway, wherein
the signal pathway comprises the first connection and the first signal pathway; and
maintaining the communications between the portable electronic device and the second component of the HVAC system, wherein the maintaining comprises:
migrating the communications between the portable electronic device and the second component of the HVAC system to another signal pathway; and
establishing a second connection between the portable electronic device and a third component of the HVAC system, wherein the second connection comprises a second wireless connection, and the third component of the HVAC system is configured to communicate with the second component of the HVAC system via a second signal pathway; and providing communication between the portable electronic device and the second component of the HVAC system via the another signal pathway, wherein the another signal pathway comprises the second connection and the second signal pathway.

15. The computing system of claim 14, wherein the maintaining further comprises:
   re-routing communications between the first component of the HVAC system and the second component of the HVAC system to a third signal pathway.

16. The computing system of claim 14, wherein the method further comprises:
   establishing a third connection between another portable electronic device and the first component of the HVAC system, wherein the third connection comprises another wireless connection; and
   maintaining the third connection during the migrating of the first connection.

* * * * *